United States Patent [19]

Rabe

[11] 4,378,930
[45] Apr. 5, 1983

[54] NOVEL APPARATUS

[75] Inventor: Jürgen Rabe, Aurachtal, Fed. Rep. of Germany

[73] Assignee: INA Walzlager Schaeffler KG, Herzogenaurach, Fed. Rep. of Germany

[21] Appl. No.: 368,040

[22] Filed: Apr. 13, 1982

[30] Foreign Application Priority Data

Apr. 25, 1981 [DE] Fed. Rep. of Germany ....... 3116526

[51] Int. Cl.³ .......................... B29C 1/00; B29F 1/00
[52] U.S. Cl. .................................. 249/160; 249/142; 249/205; 249/60
[58] Field of Search ................. 249/160, 142, 205, 60, 249/2, 189

[56] References Cited

U.S. PATENT DOCUMENTS

| | | | |
|---|---|---|---|
| 1,003,837 | 9/1911 | White | 249/60 X |
| 2,650,410 | 9/1953 | Mitchell | 249/2 |
| 2,836,853 | 6/1958 | Altman | 249/60 |
| 3,362,675 | 1/1968 | Ferdig | 249/160 X |
| 3,795,382 | 3/1974 | Gruber et al. | 249/160 X |
| 4,090,683 | 5/1978 | Langhammer et al. | 249/60 |
| 4,303,221 | 12/1981 | Gallusser et al. | 249/142 X |

*Primary Examiner*—J. Howard Flint, Jr.
*Attorney, Agent, or Firm*—Hammond., Littell, Weissenberger and Muserlian

[57] ABSTRACT

An apparatus for producing a cage made of castable or injection moldable material for cylindrical rollers in which the pockets of the cage are defined by webs having projections projecting into the pockets at their longitudinal sides for radially retaining the rollers comprising slide plates radially moveable for forming the roller pockets, each slide plate being formed of several partial slide plates, the end faces of the slide plates having cover plates arranged thereon to cover the connection juncture between the partial slide plates and secured to one of the partial slide plates.

2 Claims, 2 Drawing Figures

NOVEL APPARATUS

STATE OF THE ART

With slide plates made of several partial slide plates, the injection of the castable or injection moldable material into the apparatus causes particles of the said material to penetrate into the connection junctures existing at the end faces between the partial slide plates because of the high pressure used which leads to increased wear and eventual early destruction of the slide plate and therefore the entire apparatus.

OBJECTS OF THE INVENTION

It is an object of the invention to provide an improved economical and simple slide plate for molding cages with a prolonged life span.

This and other objects and advantages of the invention will become obvious from the following detailed description.

THE INVENTION

The novel apparatus of the invention for producing a cage made of castable or injection moldable material for cylindrical rollers in which the pockets of the cage are defined by webs having projections projecting into the pockets at their longitudinal sides for radially retaining the rollers is comprised of slide plates radially movable for forming the roller pockets, each slide plate being formed of several partial slide plates, the end faces of the slide plates having cover plates arranged thereon to cover the connection juncture between the partial slide plates and secured to one of the partial slide plates. The said construction has the advantage that the injected material can no longer penetrate the juncture during the injection thereof and the wear of the prior art is avoided whereby the life of the slide plate and the entire apparatus is prolonged.

In one embodiment of the invention, the cover plates at the ends of the slide plates project in the circumferential direction of the cage on both sides and are rounded at their end edges. Such a construction gives an additional improvement of the sealing of the juncture point and at the same time forms radii in the area of the pocket corners which reduce notch stresses existing there, which stresses often lead to breaking of the cage and the resulting damage caused thereby.

Referring now to the drawings.

Figure 1:
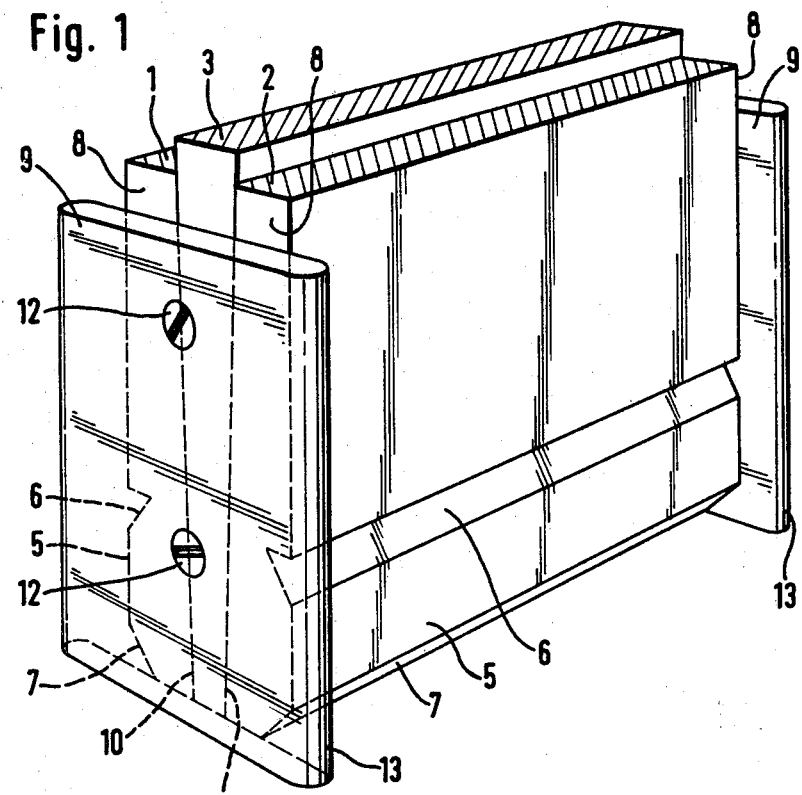
FIG. 1 is a partial perspective view of one slide plate embodiment of the apparatus of the invention.

The apparatus for the production of a cage made of castable or injection moldable material with roller pockets is known and the slide plate of the invention illustrated in FIG. 1 can be used therein. The said slide plate consists of two outer partial slide plates 1 and 2 and a central, wedge-shaped partial slide plate 3. In the illustrated retracted end position of FIG. 1, the partial slide plates 1,2 and 3 in conjuntion with a core (not shown) form the contour of the roller pockets 4, the inner longitudinal sides of the pockets 4 being formed by the flat surfaces 5 of the outer partial slide plates 1 and 2. Recesses 6 and 7 are provided at the lower and upper ends of flat surfaces 5 to form the projections extending into the pockets 4 to retain the rollers in both radial directions.

Figure 2:
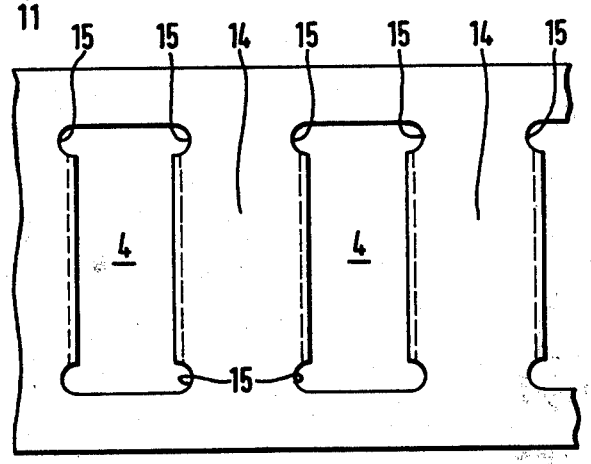
FIG. 2 is a partial top view of a section of a cage produced with the apparatus of FIG. 1.

Cover plates 9 are arranged at the end faces 8 of the slide plates to cover the juncture joints 10 and 11 existing between the partial slide plates 1, 2 and 3 and the cover plates 9 are firmly secured to the wedge-shaped partial slide plate 3 by screws 12. The cover plates 9 extend past both sides of the slide plates in the circumferential direction of the cage and are rounded at their end edges 13. As can be seen from FIG. 2, radii 15 of a corresponding size are formed in the area of the side bars 14 thereby avoiding notch stresses.

To remove the formed cage from the mold, the central wedge-shaped partial sides 3 are first pulled radially outwardly until the outer partial slide plates 1 and 2 can move into the interior of the pocket far enough so that they may be removed from the pocket without damaging the projections formed by recesses 7. Then, the cage can be ejected from the mold and the partial slide plates 1,2 and 3 can be reinserted into the apparatus in reverse order.

Various modifications of the apparatus of the invention may be made without departing from the spirit or scope thereof and it is to be understood that the invention is intended to be limited only as defined in the apparatus claims.

What I claim is:

1. An apparatus for producing a cage made of castable or injection moldable material for cylindrical rollers, the pockets of the cage being defined by webs which have projections projecting into the pockets at their longitudinal sides for radially retaining the rollers comprising slide plates radially moveable for forming the roller pockets, each slide plate being formed of several partial slide plates, the end faces of the slide plates having cover plates arranged thereon to cover the connection juncture between the partial slide plates and secured to one of the partial slide plates.

2. An apparatus of claim 1 wherein the cover plates extend past both sides of the slide plate in the circumferential direction of the cage and the end edges thereof are rounded to simultaneously seal the juncture between the said partial plates and form radii in the area of the pocket corners.

* * * * *